(12) United States Patent
Cho et al.

(10) Patent No.: US 11,448,550 B2
(45) Date of Patent: Sep. 20, 2022

(54) OPTICAL MEASUREMENT DEVICE

(71) Applicant: Samsung Display Co., LTD., Yongin-si (KR)

(72) Inventors: Dae Youn Cho, Yongin-si (KR); Eu Gene Kim, Seongnam-si (KR); Ji Ho Moon, Hwaseong-si (KR); Jong Woo Park, Seongnam-si (KR); Young Tae Choi, Cheonan-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 17/153,678

(22) Filed: Jan. 20, 2021

(65) Prior Publication Data
US 2021/0223096 A1 Jul. 22, 2021

(30) Foreign Application Priority Data
Jan. 21, 2020 (KR) .................. 10-2020-0008171

(51) Int. Cl.
*G01J 1/42* (2006.01)
*G09G 3/3275* (2016.01)

(52) U.S. Cl.
CPC .............. *G01J 1/42* (2013.01); *G09G 3/3275* (2013.01); *G09G 2320/04* (2013.01); *G09G 2330/021* (2013.01); *G09G 2360/16* (2013.01)

(58) Field of Classification Search
CPC ......... G09G 2360/16; G09G 2330/021; G09G 2320/04; G09G 3/3275; G01J 1/42
See application file for complete search history.

(56) References Cited

U.S. PATENT DOCUMENTS 5,663,772 A * 9/1997 Uehara .................. G09G 5/28
345/589

\* cited by examiner

*Primary Examiner* — Kenneth B Lee, Jr.
(74) *Attorney, Agent, or Firm* — Cantor Colburn LLP

(57) ABSTRACT

An optical measurement device includes an optical sensor which measures an optical waveform of a reference object or a measurement object, a learner which receives a first optical waveform of the reference object from the optical sensor and learns frequency characteristics of the first optical waveform, a filter generator which analyzes the frequency characteristics of the first optical waveform and generates a frequency filter, a frequency modeling unit which receives a second optical waveform of the measurement object from the optical sensor and models frequency characteristics of the second optical waveform, and an optical characteristic detector which calculates an optical characteristic index of the second optical waveform based on an output value of the frequency modeling unit and the frequency filter.

20 Claims, 16 Drawing Sheets

OPTICAL MEASUREMENT DEVICE

This application claims priority to Korean Patent Application No. 10-2020-0008171, and all the benefits accruing therefrom under 35 U.S.C. § 119, the content of which in its entirety is herein incorporated by reference.

BACKGROUND

1. Field

Embodiments of the invention relate to an optical measurement device for measuring the luminance and flicker of a display device.

2. Description of the Related Art

A display device includes a display panel including a plurality of pixels for displaying an image, a gate driver supplying gate signals to the pixels, and a data driver supplying data voltages to the pixels. Each of the plurality of pixels includes a light emitting element and a pixel circuit for driving the light emitting element.

A display device may be driven within a plurality of frames through refresh periods and hold periods. The pixel circuit of the display device may be driven at a low speed in order to reduce power consumption, and a period of the refresh periods may be increased. As the period of the refresh periods increases, a time interval between adjacent refresh periods may increase, and the decrease in luminance of the light emitting element that occurs during the refresh periods may be perceived by the viewer. Accordingly, the pixel driven at a low speed may generate flicker due to luminance decrease and a charge delay, thereby causing a deterioration of visual perception.

An optical measurement device may measure the luminance and flicker of a display device in the process of manufacturing the display device. A conventional optical measurement device may measure the luminance of a display panel or a display module that is driven at a low speed, and may analyze flicker.

SUMMARY

Embodiments of the invention provide an optical measurement device capable of learning the frequency characteristics resulting from a display panel and the frequency characteristics resulting from a display driver by learning the frequency characteristics of a first optical waveform emitted from a display module including the display panel and the display driver.

Other embodiments of the invention provide an optical measurement device capable of measuring the frequency characteristics of a first optical waveform from a second optical waveform by learning the frequency characteristics of the first optical waveform emitted from a display panel driven by a display driver and measuring the second optical waveform emitted from the display panel driven by an illuminator.

However, features of the invention are not restricted to the one set forth herein. The above and other features of the invention will become more apparent to one of ordinary skill in the art to which the invention pertains by referencing the detailed description of the invention given below.

An embodiment of the invention provides an optical measurement device, including an optical sensor which measures an optical waveform of a reference object or a measurement object, a learner which receives a first optical waveform of the reference object from the optical sensor and learns frequency characteristics of the first optical waveform, a filter generator which analyzes the frequency characteristics of the first optical waveform and generates a frequency filter, a frequency modeling unit which receives a second optical waveform of the measurement object from the optical sensor and models frequency characteristics of the second optical waveform, and an optical characteristic detector which calculates an optical characteristic index of the second optical waveform based on an output value of the frequency modeling unit and the frequency filter.

In an embodiment, the reference object may be a display module including a first display panel and a display driver which supplies a data voltage to the first display panel according to a predetermined driving frequency.

In an embodiment, the learner may include a domain converter which receives the first optical waveform and converts the first optical waveform into a frequency domain, a weighted value applying unit which applies at least one weighted value filter to an output value of the domain converter, and a classification unit which classifies a kind of the first optical waveform based on an output value of the weighted value applying unit.

In an embodiment, the domain converter may convert a domain of the first optical waveform using Fast Fourier Transform.

In an embodiment, the at least one weighted value filter may include a plurality of weighted values corresponding to frequency components of the first optical waveform.

In an embodiment, the weighted value applying unit may apply an activation function to an output value of the at least one weighted value filter.

In an embodiment, the learner may receive the second optical waveform of the measurement object and learn frequency characteristics of the second optical waveform.

In an embodiment, the learner may convert the first optical waveform or the second optical waveform into a frequency domain and applies the at least one weighted value filter to learn frequency characteristics of the first optical waveform or the second optical waveform.

In an embodiment, the reference object may be provided in plural and the filter generator may calculate a range of frequency domain values of the first optical waveforms of a plurality of reference objects based on the output value of the domain converter for each of the plurality of reference objects, convert the calculated value into a time domain and generate a frequency filter.

In an embodiment, the filter generator may generate a band pass filter which passes a predetermined frequency band of the first optical waveform.

In an embodiment, the measurement object may receive a direct current ("DC") voltage from a lighting device and emits light.

In an embodiment, the frequency modeling unit may convert the second optical waveform into a frequency domain to model frequency characteristics of the second optical waveform.

In an embodiment, the optical characteristic detector may apply the frequency filter and a flicker filter to an output value of the frequency modeling unit and calculate a flicker index of the second optical waveform.

In an embodiment, the flicker filter may be a contrast sensitivity function.

An embodiment of the invention provides an optical measurement device, including a learner which receives a first optical waveform of a first display module including a first display panel and a display driver which supplies a data voltage to the first display panel according to a predetermined driving frequency, and learns frequency characteristics of the first optical waveform, a filtering unit which analyzes frequency characteristics of the first optical waveform and generates a frequency filter, a frequency modeling unit which receives a second optical waveform of a second display panel which receives a DC voltage from a lighting device and models frequency characteristic of the second optical waveform, and an optical characteristic detector which calculates an optical characteristic index of the second optical waveform based on an output value of the frequency modeling unit and the frequency filter.

In an embodiment, the learner may include a domain converter which receives the first optical waveform and converts the first optical waveform into a frequency domain, a weighted value applying unit which applies at least one weighted value filter to an output value of the domain converter, and a classification unit which classifies a kind of the first optical waveform based on an output value of the weighted value applying unit.

In an embodiment, the learner may receive the second optical waveform of the second display panel and learn frequency characteristics of the second optical waveform.

In an embodiment, the learner may convert the first optical waveform or the second optical waveform into a frequency domain and apply at least one weighted value filter to learn the frequency characteristics of the first optical waveform or the second optical waveform.

In an embodiment, the optical characteristic detector may apply the frequency filter and a flicker filter to the output value of the frequency modeling unit and calculate a flicker index of the second optical waveform.

In an embodiment, the optical characteristic detector may analyze flicker characteristics of the first display module including the first display panel and the display driver based on the flicker index of the second optical waveform.

BRIEF DESCRIPTION OF THE DRAWINGS

The above and other embodiments, advantages and features of the invention will become more apparent by describing in detail embodiments thereof with reference to the attached drawings, in which.

DETAILED DESCRIPTION

Figure 1:
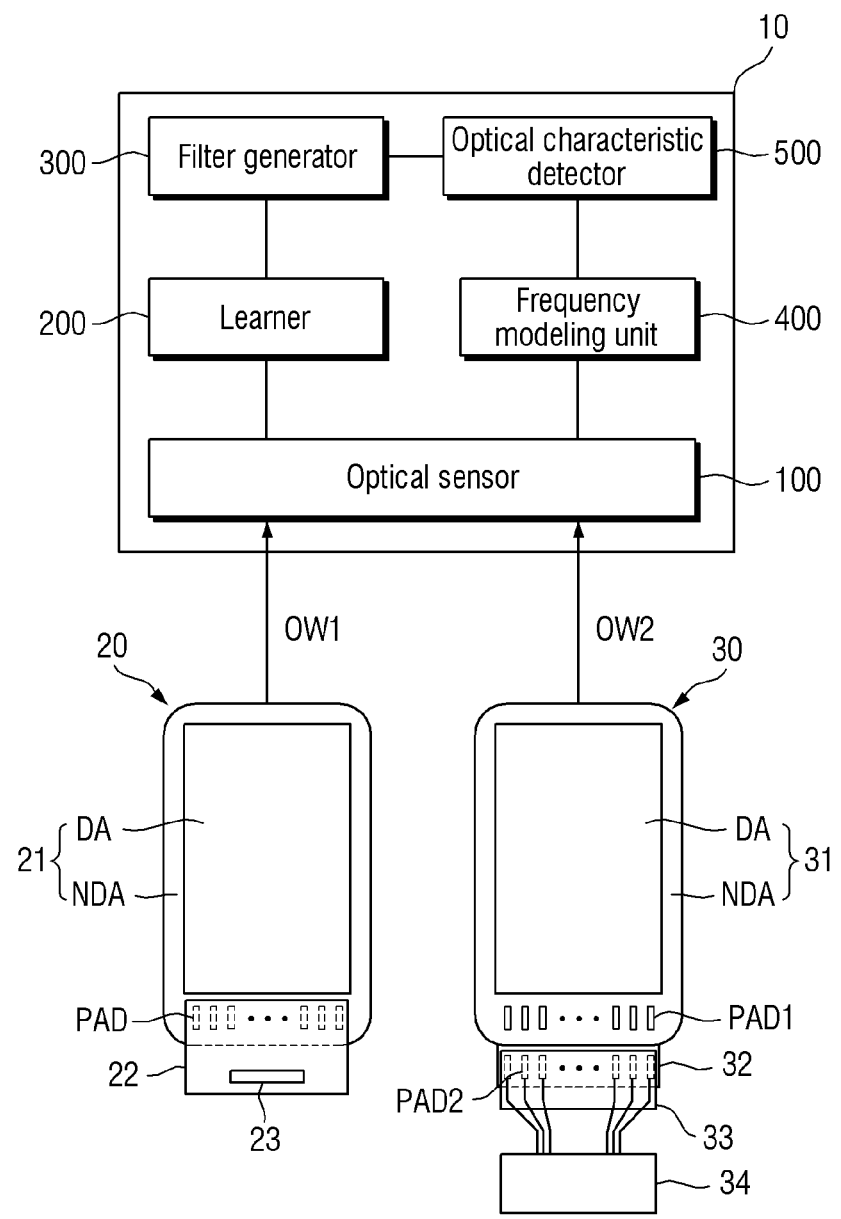
FIG. 1 is a view illustrating an embodiment of an optical measurement device.

Features of the invention and methods of accomplishing the same may be understood more readily by reference to the following detailed description of embodiments and the accompanying drawings. The inventive concept may, however, be embodied in many different forms and should not be construed as being limited to the embodiments set forth herein. Rather, these embodiments are provided so that this invention will be thorough and complete and will fully convey the concept of the invention to those skilled in the art, and the invention will only be defined by the appended claims. Like reference numerals refer to like elements throughout the specification.

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on", "directly connected to" or "directly coupled to" another element or layer, there are no intervening elements or layers present. As used herein, the term "and/or" includes any and all combinations of one or more of the associated listed items.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Hereinafter, embodiments will be described with reference to the attached drawings.

Figure 2:
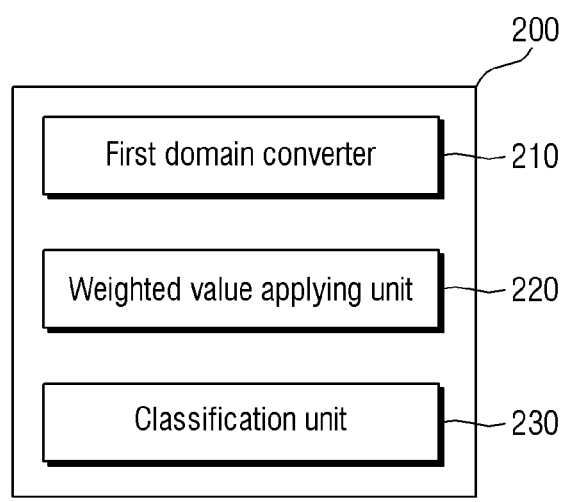
FIG. 2 is a block diagram illustrating an embodiment of a learner of an optical measurement device.
Figure 3:
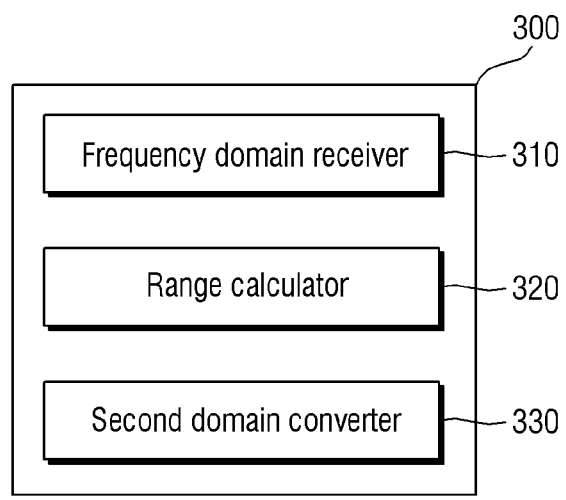
FIG. 3 is a block diagram illustrating an embodiment of a filter generator of an optical measurement device.

FIG. 1 is a view illustrating an embodiment of an optical measurement device, FIG. 2 is a block diagram illustrating an embodiment of a learner of an optical measurement device, and FIG. 3 is a block diagram illustrating an embodiment of a filter generator of an optical measurement device.

Referring to FIGS. 1 to 3, an optical measurement device 10 may measure an optical waveform of a lighting device or an image display device to calculate an optical characteristic index of the optical waveform. In an embodiment, the optical measurement device 10 may measure an optical waveform of a display panel or a display module to calculate the optical characteristic index of the optical waveform due to the display panel, the optical characteristic index of the optical waveform due to the display module, or the optical characteristic index of the optical waveform due to the display driver, for example.

A first display module 20 may include a first display panel 21, a first circuit board 22, and a display driver 23. The display area DA of the first display panel 21 may include data lines, scan lines, voltage supply lines, and a plurality of pixels connected to the data lines and the scan lines. The non-display area NDA of the first display panel 21 may include a scan driver (not shown) for applying scan signals to the scan lines, and pads PAD connected to the display driver 23.

A first circuit board 22 may be attached onto the pads PAD using an anisotropic conductive film. The display driver 23 may be disposed on the first circuit board 22 to drive the first display panel 21 according to a predetermined driving frequency. In an embodiment, the display driver 23 may be provided as an integrated circuit ("IC") and disposed (e.g., mounted) on the first circuit board 22, for example.

In an embodiment, the display driver 23 may drive the first display panel 21 within a plurality of frames through a refresh period and a hold period, for example. The display driver 23 may initialize a data voltage of each of the plurality of pixels during the refresh period. The display driver 23 may control the initialization speed and update speed of the data voltage by adjusting the period of the refresh periods, thereby reducing power consumption and preventing the deterioration of a driving transistor and a light emitting element of the pixel. In embodiment, when the display driver 23 displays a still image in which the data voltage does not need to be updated quickly, the display driver 23 may be driven at a low speed by reducing the initialization speed and update speed of the data voltage, for example, thereby reducing power consumption.

Accordingly, the first display module 20 is driven by the display driver 23, so that the first optical waveform OW1 emitted from the first display module 20 may have frequency characteristics resulting from the first display panel 21 and frequency characteristics resulting from the display driver 23. The optical measurement device 10 may learn the frequency characteristics of the first optical waveform OW1 emitted from the first display module 20, thereby learning the frequency characteristics resulting from the first display panel 21 and the frequency characteristics resulting from the display driver 23.

A second display module 30 may include a second display panel 31, a lighting pad unit 32, a second circuit board 33, and a lighting device 34. The display area DA of the second display panel 31 may include data lines, scan lines, voltage supply lines, and a plurality of pixels connected to the data lines and the scan lines. The non-display area NDA of the second display panel 31 may include a scan driver (not shown) for applying scan signals to the scan lines, first pads PAD1, and second pads PAD2 connected to the first pads PAD1. In an embodiment, the second display panel 31 may have the same specifications as the first display panel 21, and the first display panel 21 and the second display panel 31 may be different in that they are driven by the display driver and the lighting device 34, respectively, for example.

The lighting pad unit 32 may be disposed at one side of the second display panel 31, and the second pads PAD2 of the lighting pad unit 32 may be connected to the first pads PAD1 of the second display panel 31. The lighting pad unit 32 may be connected to the lighting device 34 during the test process of the second display panel 31, and may be removed from the second display panel 31 when the test of the second display panel 31 is completed.

The second circuit board 33 may be attached onto the second pads PAD2 using an anisotropic conductive film. The lighting device 34 may supply a lighting voltage or a driving voltage to the second display panel 31 through the second circuit board 33 and the second pads PAD2. In an embodiment, the lighting device 34 may supply a lighting voltage of direct current ("DC") to each of the plurality of pixels through the data lines of the second display panel 31, and may supply a driving voltage of DC to each of the plurality of pixels through the voltage supply lines of the second display panel 31, for example.

Accordingly, the second display module 30 is driven by the lighting device 34, so that the second optical waveform OW2 emitted from the second display module 30 may have frequency characteristics resulting from the second display panel 31.

After the test of the second display module 30 driven by the lighting device 34 is completed, the second display panel 31 may be used as the first display panel 21 of the first display module 20. After the test of the second display module 30 is completed, the test of the first display module 20 driven by the display driver 23 may be performed. Therefore, when both the test of the first display module 20 and the test of the second display module 30 proceed, the optical characteristic index resulting from the display panel may be detected according to the test result of the second display module 30, and the optical characteristic index resulting from the display driver may be detected according to the test result of the first display module 20.

The optical measurement device 10 may learn the frequency characteristic of the first optical waveform OW1 of a reference object, and may detect the same frequency characteristics as the first optical waveform OW1 or similar frequency characteristics to the first optical waveform OW1 from the second optical waveform OW2 of a measurement object. The optical measurement device may learn the frequency characteristics of the first optical waveform OW1 emitted from the first display module 20, and may measure the same frequency characteristic as the first optical waveform OW1 or similar frequency characteristic to the first optical waveform OW1 in the second optical waveform OW2 emitted from the second display module 30. Therefore, the optical measurement device 10 may measure the frequency characteristic of the first optical waveform OW1 from the second optical waveform OW2 using the learning result of the frequency characteristic, and may omit the test process of the first display module 20 using the test result of the second display module 30. The optical measurement device 10 may omit the test process of the first display module 20 after the learning of the first display module 20 is completed, and thus cost and time may be reduced in the process of manufacturing the display device or the display panel.

The optical measurement device 10 may include an optical sensor 100, a learner 200, a filter generator 300, a frequency modeling unit 400, and an optical characteristic detector 500.

The optical sensor 100 may be in direct contact with the first or second display module 20 or 30 or may be spaced apart from the first or second display module 20 or 30, and may measure the first optical waveform OW1 of the first display module 20 or the second optical waveform OW2 of the second display module 30. In an embodiment, the optical sensor 100 may measure the luminance of light emitted from the first or second display module 20 or 30, and may convert the measured luminance into a voltage, for example.

The learner 200 may receive the first optical waveform OW1 of the reference object from the optical sensor 100 to learn the frequency characteristics of the first optical waveform OW1. The learner 200 may receive the first optical waveform OW1 of the reference object or the second optical waveform OW2 of the measurement object from the optical sensor 100 to learn the frequency characteristics of the first optical waveform OW1 or the second optical waveform OW2. The learner 200 may receive the first optical waveform OW1 of the first display module 20 or the second optical waveform OW2 of the second display module 30 from the optical sensor 100 to learn the frequency characteristics of the first optical waveform OW1 or the second optical waveform OW2. The learner 200 may include a first domain converter 210, a weighted value applying unit 220, and a classification unit 230.

The first domain converter 210 may receive the first optical waveform OW1 from the optical sensor 100 and convert the first optical waveform OW1 into a frequency domain. The first optical waveform OW1 may be expressed as a time domain, and the first domain converter 210 may convert the first optical waveform OW1 of the time domain into the frequency domain. Therefore, the first domain converter 210 may express the first optical waveform OW1 as a magnitude value for each frequency. In an embodiment, the first domain converter 210 may convert the domain of the first optical waveform OW1 using Fast Fourier Transform ("FFT"), for example, but the invention is not limited thereto.

The weighted value applying unit 220 may apply at least one weighted value filter to the output value of the first domain converter 210. The output value of the first domain converter 210 may be a frequency domain value of the first optical waveform OW1. The output value of the first domain converter 210 may have a magnitude value of the first optical waveform OW1 for each frequency. The weighted value applying unit 220 applies a weighted value for each frequency to the frequency domain value of the first optical waveform OW1 to extract the frequency characteristics of the first optical waveform OW1. Therefore, the learner 200 may easily grasp the frequency characteristics of the first optical waveform OW1.

The weighted value applying unit 220 may include at least one weighted value filter. In an embodiment, the weighted value applying unit 220 may include first and second weighted value filters, for example. The first weighted value filter and the second weighted value filter may have different weighted values from each other for each of the plurality of frequencies. The weighted value of each of the first and second weighted value filters may be preset according to the purpose and use of the optical measurement device 10. In an embodiment, the weighted value of each of the first and second weighted value filters may be preset by the user, for example. In another embodiment, the weighted value of each of the first and second weighted value filters may be updated according to the repeated learning of frequency characteristics. In another embodiment, the weighted value of each of the first and second weighted value filters may be changed by the user after being preset by the user, and may reflect the learning result of frequency characteristics.

The weighted value applying unit 220 may apply an activation function to the output value of at least one weighted value filter. In an embodiment, the activation function may output a value of 1 ($h(fk)=1$) when the output value of the weighted value filter for a predetermined frequency ($fk$, k is a natural number of 1 or more) is close to 1, and may output a value of 0 ($h(fk)=0$) when the output value of the weighted value filter for a predetermined frequency ($fk$) is close to 0, for example. In another embodiment, the activation function may output a value of 1 ($h(fk)=1$) when learning the frequency characteristics of the first optical waveform OW1 of the first display module 20, and may output a value of 0 ($h(fk)=0$) when learning the frequency characteristics of the second optical waveform OW2 of the second display module 30. Therefore, the weighted value applying unit 220 may change the output of the weighted value applying unit 220 to a nonlinear value by the activation function.

The classification unit 230 may classify the kind of the first optical waveform OW1 based on the output value of the weighted value applying unit 220. In an alternative embodiment, the classification unit 230 may classify the kind of the first optical waveform OW1 or the second optical waveform OW2 based on the output value of the weighted value applying unit 220. In an embodiment, when the output value of the weighted value applying unit 220 is 1, the classification unit 230 may determine that the corresponding optical waveform is an optical waveform of the first display module 20, for example. When the output value of the weighted value applying unit 220 is 0, the classification unit 230 may determine that the corresponding optical waveform is an optical waveform of the second display module 30.

Therefore, the learner 200 may receive the first optical waveform OW1 of the reference object or the second optical waveform OW2 of the measurement object from the optical sensor 100 to learn the frequency characteristics of the first optical waveform OW1 or the second optical waveform OW2. The learning result of the learner 200 may be reflected in the filter generation process of the filter generator 300.

The filter generator 300 may analyze the frequency characteristics of the first optical waveform OW1 to generate a frequency filter. The filter generator 300 may calculate a range of frequency domain values of the first optical waveforms OW1 of the plurality of reference objects based on the output value of the first domain converter 210 for each of the plurality of reference objects, and may convert the calculated value into a time domain to generate a frequency filter. In an embodiment, the filter generator 300 may calculate a range of frequency domain values of the first optical waveforms OW1 based on the output value of the first domain converter 210 for each of the plurality of first display modules 20, and may convert the calculated value into a time domain to generate a frequency filter, for example.

The filter generator 300 may include a frequency domain receiver 310, a range calculator 320, and a second domain converter 330.

The frequency domain receiver 310 may receive an output value of the first domain converter 210 for each of the plurality of reference objects and supply the output value to the range calculator 320. In an embodiment, the frequency domain receiver 310 may receive an output value of the first domain converter 210 for each of the plurality of first display modules 20, for example. Accordingly, the frequency domain receiver 310 may receive a frequency domain value of each of the plurality of first optical waveforms OW1 and supply the frequency domain value to the range calculator 320.

The range calculator 320 may calculate a range of frequency domain values of the first optical waveforms OW1 of the plurality of reference objects. The range calculator 320 may calculate a range of frequency domain values of the first optical waveforms OW1 of each of the plurality of first display modules 20. In an embodiment, the range calculator 320 may calculate a range of magnitudes of frequencies of the first optical waveforms OW1, for example. The range of magnitude for each frequency of the first optical waveforms OW1 may correspond to statistical frequency characteristics of frequency domain values of the first optical waveforms OW1.

The second domain converter 330 may generate a frequency filter by converting the output value of the range calculator 320 to a time domain. The output value of the range calculator 320 may be expressed as frequency domain, and the second domain converter 330 may convert a range of magnitudes for each frequency into the time domain. Accordingly, the second domain converter 330 may generate a frequency filter expressed as the time domain. In an embodiment, the second domain converter 330 may convert the domain of the output value of the range calculator 320 using IFFT, for example, but the invention is not limited thereto.

In an embodiment, the frequency filter of the filter generator 300 may be a band pass filter that passes a predetermined frequency band of the first optical waveform OW1, for example. In another embodiment, the frequency filter of the filter generator 300 may be a low pass filter, a high pass filter, a band stop filter, or an all pass filter.

The frequency modeling unit 400 may receive the second optical waveform OW2 of the measurement object from the optical sensor 100 and model the frequency characteristics of the second optical waveform OW2. The frequency modeling unit 400 may receive the second optical waveform OW2 of the second display module 30 from the optical sensor 100 and convert the second optical waveform OW2 into a frequency domain. The second optical waveform OW2 may be expressed as a time domain, and the frequency modeling unit 400 may convert the second optical waveform OW2 expressed as the time domain into the frequency domain. Therefore, the frequency modeling unit 400 may express the second optical waveform OW2 as a magnitude value for each frequency. In an embodiment, the frequency modeling unit 400 may convert the domain of the second optical waveform OW2 using FFT, for example, but the invention is not limited thereto.

The optical characteristic detector 500 may calculate an optical characteristic index of the second optical waveform OW2 based on the output value of the frequency modeling unit 400 and the frequency filter generated by the filter generator 300. Here, the optical characteristic index of the second optical waveform OW2 means a degree to which the second optical waveform OW2 has frequency characteristic of the first optical waveform OW1. In an embodiment, as the optical characteristic index of the second optical waveform OW2 increases, the second optical waveform OW2 may have frequency characteristics similar to those of the first optical waveform OW1, for example. Further, when the optical characteristic index of the second optical waveform OW2 is high, the second optical waveform OW2 of the second display module 30 and the first optical waveform OW1 of the first display module 20 may have similar frequency characteristics.

The optical characteristic detector 500 may calculate a flicker index of the second optical waveform OW2 by applying the frequency filter and the flicker filter to the output value of the frequency modeling unit 400. Here, the flicker index of the second optical waveform OW2 means a degree to which a flicker phenomenon generated in the second optical waveform OW2 originates from the display driver 23. In an embodiment, the flicker filter may be a contrast sensitivity function, for example, but the invention is not limited thereto. As the flicker index of the second optical waveform OW2 increases, the flicker generation degree of the second optical waveform OW2 by the display driver 23 may increase.

Therefore, the optical measurement device 10 may measure frequency characteristics of the first optical waveform OW1 from the second optical waveform OW2 using the learning result of the frequency characteristics, and the test process of the first display module 20 may be omitted by the test result of the second display module 30. The optical measurement device 10 may omit the test process of the first display module 20 after the learning of the first display module 20 is completed, and may reduce cost and time during the process of manufacturing a display device or a display module.

The optical measurement device 10 may further include a controller (not shown). The controller, which is a central processing unit, may control the overall operation of the optical measurement device 10, and may perform a function according to a user's operation or control. In an embodiment, the controller may control the operations of the optical sensor 100, the learner 200, the filter generator 300, the frequency modeling unit 400, and the optical characteristic detector 500, and may control signal transmission among them, for example. The controller may process an input signal or data input from the outside.

The optical measurement device 10 may further include a memory (not shown). The memory may store data input from an operating system of the optical measurement device 10, a plurality of applications, and an external device. The memory may store algorithms, data, etc., for calculating the optical characteristic index. In an embodiment, the memory may store learning information of the frequency characteristics, filter information used in the optical measurement device 10, and calculation algorithm information of the optical characteristic index, for example. Information stored in the memory may be updated according to learning of repeated frequency characteristics.

Figure 4:
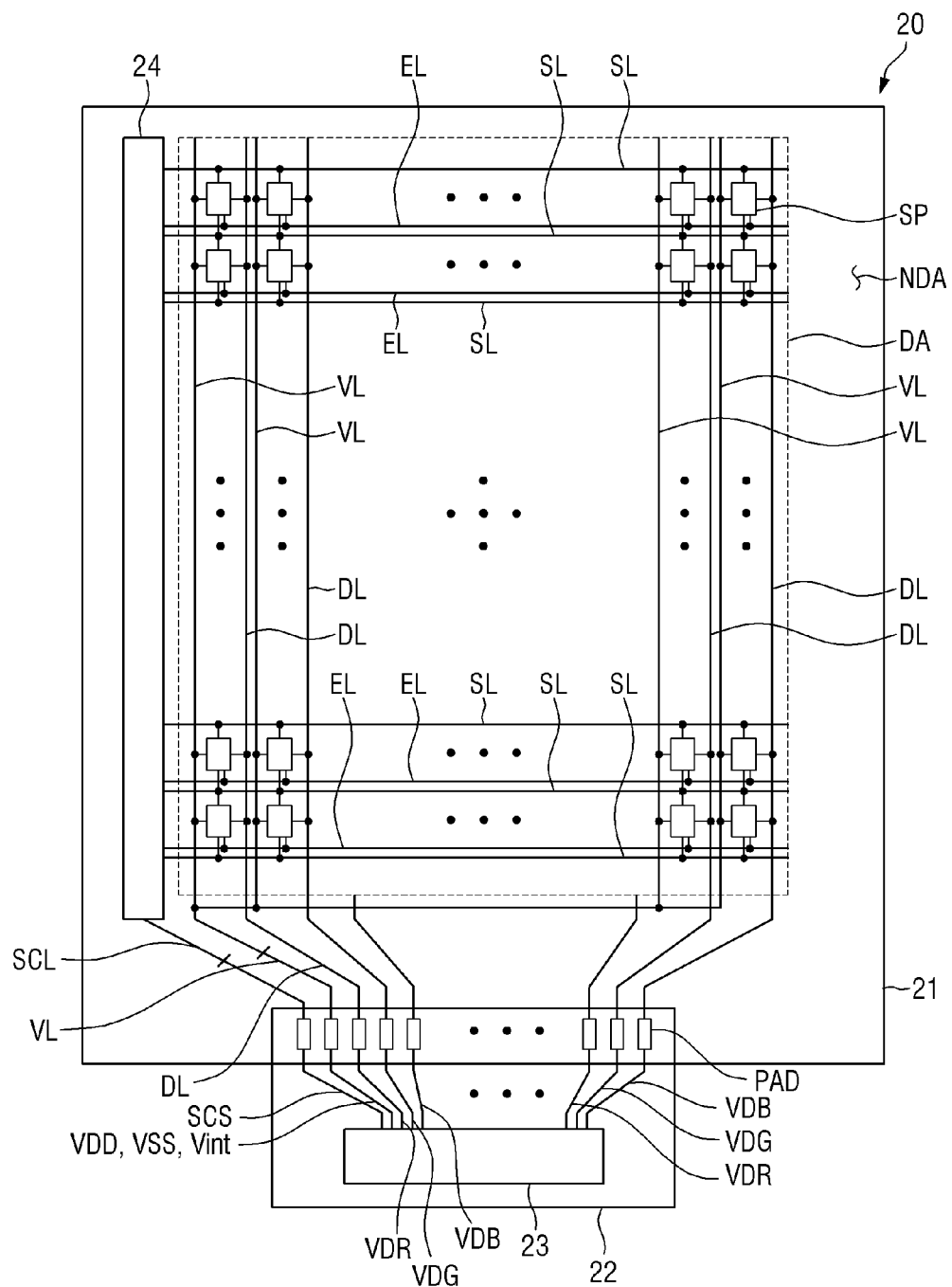
FIG. 4 is a view illustrating the first display module illustrated in FIG. 1.

FIG. 4 is a view illustrating the first display module illustrated in FIG. 1.

Referring to FIG. 4, the first display module 20 may include a first display panel 21, a first circuit board 22, and a display driver 23.

The first display panel 21 may be provided in a rectangular plane having short sides in a first direction (X-axis direction) and long sides in a second direction (Y-axis direction) crossing the first direction (X-axis direction). The corners where the short sides in the first direction (X-axis direction) meet the long sides in the second direction (Y-axis direction) may be rounded to have a predetermined curvature or may be provided at right angles. The planar shape of the first display panel 21 is not limited to a quadrangle, and may be provided in the shape of another polygon, a circle, or an ellipse. The first display panel 21 may be flat, but is not limited thereto. The first display panel 21 may include a curved portion having a predetermined curvature or a changing curvature provided at left and right ends. In addition, the first display panel 21 may be flexibly provided to be warped, curved, bent, folded, or rolled.

The first display panel 21 may include a display area DA in which pixels SP display an image, and a non-display area NDA that is a peripheral area of the display area DA. The display area DA may include pixels SP, scan lines SL connected to the pixels SP, emission control lines EL, data lines DL, and voltage supply lines VL. The scan lines SL and the emission control lines EL may be provided in parallel with each other in the first direction (X-axis direction), and the data lines DL and the voltage supply lines VL may be provided in parallel with each other in the second direction (Y-axis direction) crossing the first direction (X-axis direction).

Each of the pixels SP may be connected to at least one scan line SL, at least one data line DL, at least one emission control line EL, and at least one voltage supply line VL. Each of the pixels SP may connected to two scan lines SL, one data line DL, one emission control line EL, and one voltage supply line VL, but the invention is not limited thereto. For another example, each of the pixels SP may be connected to three scan lines SL.

Each of the pixels SP may include a driving transistor, at least one switching transistor, a light emitting element, and at least one capacitor. The switching transistor may be turned on when a scan signal is applied from the scan line SL, and thus a data voltage of the data line DL may be applied to a gate electrode of the driving transistor. The driving transistor may supply a driving current to the light emitting element according to the data voltage applied to the gate electrode, and the light emitting element may emit light having a predetermined luminance according to the magnitude of the driving current. In an embodiment, the driving transistor and the at least one switching transistor may be thin film transistors, for example. The light emitting element may be an organic light emitting diode including a first electrode, an organic light emitting layer, and a second electrode. The capacitor may keep the data voltage applied to the gate electrode of the driving transistor constant.

The non-display area NDA may be defined as an area from the outside of the display area DA to the edge of the first display panel 21. The non-display area NDA may include a scan driver 24 for applying scan signals to the scan lines SL, and pads PAD connected to the display driver 23. In an embodiment, the pads PAD may be disposed at one edge of the first display panel 21, for example.

The first circuit board 22 may be attached onto the pads PAD using an anisotropic conductive film. Thus, lead lines of the first circuit board 22 may be electrically connected to the pads PAD. In an embodiment, the first circuit board 22 may be a flexible film such as a flexible printed circuit board, a printed circuit board, or a chip on film, for example.

The display driver 23 may be disposed on the first circuit board 22 to drive the first display panel 21 according to a predetermined driving frequency. The display driver 23 may supply a scan control signal SCS to the scan driver 24 through a plurality of scan control lines SCL. The display driver 23 may supply a first driving voltage VDD, a second driving voltage VSS, and an initialization voltage Vint to the plurality of pixels SP through the voltage supply lines VL. The display driver 23 may supply data voltages VDR, VDG, and VDB to the plurality of pixels SP through the data lines DL. In an embodiment, the display driver 23 may be provided as an IC and disposed (e.g., mounted) on the first circuit board 22, for example.

In an embodiment, the display driver 23 may drive the first display panel 21 within a plurality of frames through a refresh period and a hold period, for example. The display driver 23 may initialize data voltages of each of the plurality of pixels during the refresh period. The display driver 23 may adjust the period of the refresh periods to control the initialization rate and update rate of the data voltage, thereby reducing power consumption and preventing the deterioration of the driving transistor and the light emitting element of the pixel. In an embodiment, when the display driver 23 displays a still image in which the data voltage does not need to be updated quickly, the display driver 23 may be driven at a low speed by reducing the initialization speed and the update speed of the data voltage, for example, thereby reducing power consumption.

Accordingly, since the first display module 20 is driven by the display driver 23, the first optical waveform OW1 emitted from the first display module 20 may have frequency characteristics resulting from the first display panel 21 and frequency characteristics resulting from the display driver 23. The optical measurement device 10 may learn the frequency characteristics of the first optical waveform OW1 emitted from the first display module 20, thereby learning the frequency characteristics resulting from the first display panel 21 and the frequency characteristics resulting from the display driver 23.

The scan driver 24 may be connected to the display driver 23 through the plurality of scan control lines SCL. The scan driver 24 may receive a scan control signal SCS from the display driver 23 through the plurality of scan control lines SCL.

Figure 5:
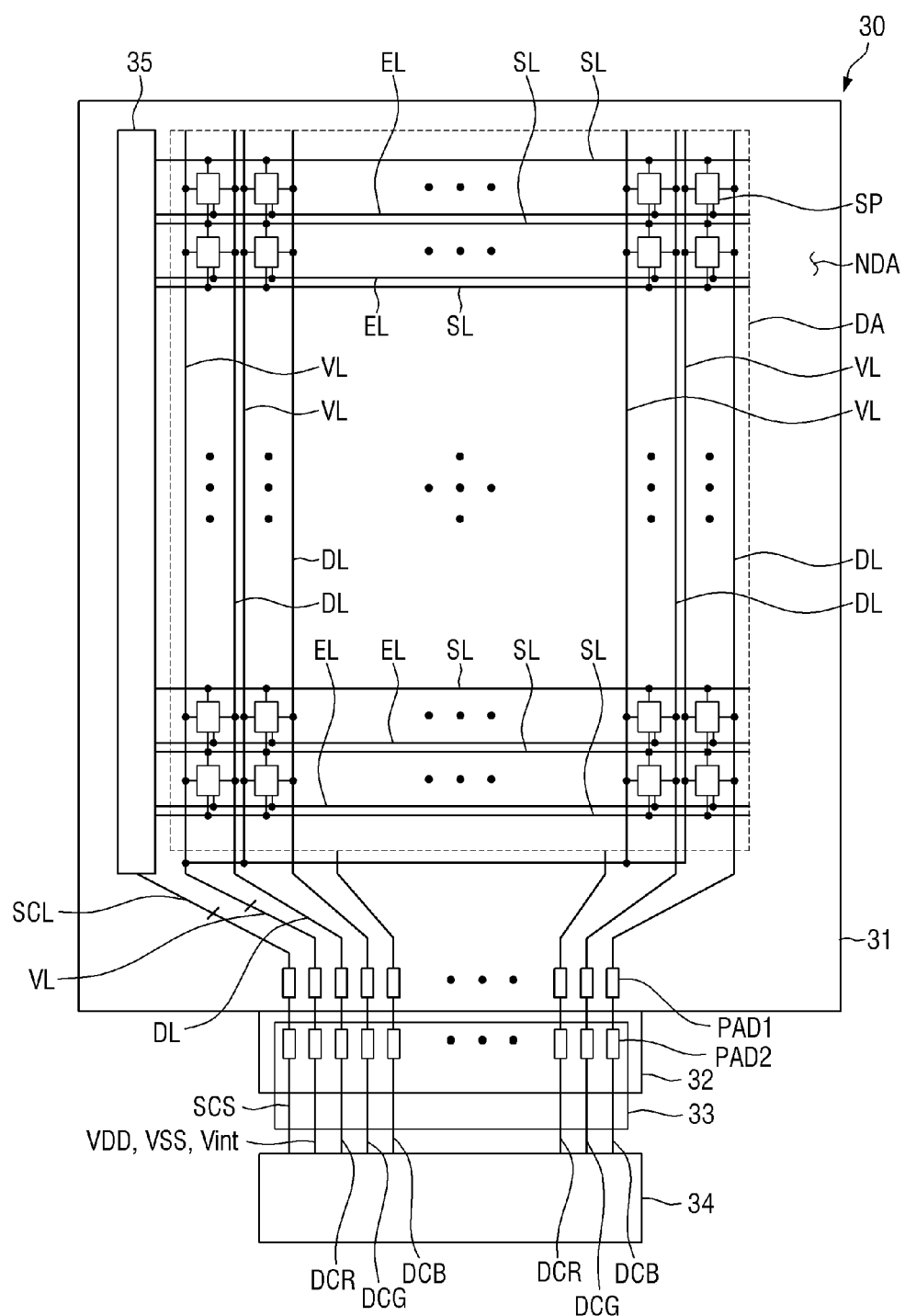
FIG. 5 is a view illustrating the second display module illustrated in FIG. 1.

FIG. 5 is a view illustrating the second display module illustrated in FIG. 1. Here, since the second display panel 31 of FIG. 5 has the same specification as the first display panel 21 of FIG. 4, the same configuration as the above-described configuration will be briefly described or omitted.

Referring to FIG. 5, the second display module 30 may include a second display panel 31, a lighting pad unit 32, a second circuit board 33, a lighting device 34, and a scan driver 35. The display area DA of the second display panel 31 may include data lines, scan lines, voltage supply lines, and a plurality of pixels connected to the corresponding data lines and scan lines. The non-display area NDA of the second display panel 31 includes a scan driver 35 for applying scan signals to scan lines, first pads PAD1, and second pads PAD2 connected to the first pads PAD1. In an embodiment, the second display panel 31 may have the same specifications as the first display panel 21, and the first display panel 21 and the second display panel 31 may be different in that they are driven by the display driver and the lighting device 34, respectively, for example.

The lighting pad unit 32 may be disposed at one side of the second display panel 31, and the second pads PAD2 of the lighting pad unit 32 may be connected to the first pads PAD1 of the second display panel 31. The lighting pad unit 32 may be connected to the lighting device 34 during the test process of the second display panel 31, and may be removed from the second display panel 31 when the test of the second display panel 31 is completed.

The second circuit board 33 may be attached onto the second pads PAD2 using an anisotropic conductive film. The lighting device 34 may supply a lighting voltage or a driving voltage to the second display panel 31 through the second circuit board 33 and the second pads PAD2. In an embodiment, the lighting device 34 may supply the scan control signal SCS to the scan driver 35 through the plurality of scan control lines SCL, for example. The lighting device 34 may supply the first driving voltage VDD, the second driving voltage VSS, and the initialization voltage Vint to the plurality of pixels SP through the voltage supply lines VL. The lighting device 34 may supply DC lighting voltages DCR, DCG, and DCB to the plurality of pixels SP through the data lines DL. Thus, since the second display module 30 is driven by the lighting device 34, the second optical waveform OW2 emitted from the second display module 30 may have frequency characteristics resulting from the second display panel 31.

The second display panel 31 may be used as the first display panel 21 of the first display module 20 after the test of the second display module 30 driven by the lighting device 34 is completed. After the test of the second display module 30 is completed, the test of the first display module 20 driven by the display driver 23 may proceed. Therefore, when both the test of the first display module 20 and the test of the second display module 30 proceed, the optical characteristic index resulting the display panel may be detected according to the test result of the second display module 30, and the optical characteristic index resulting from the display driver may be detected according to the test result of the first display module 20.

The scan driver 35 may be connected to the lighting device 34 through the plurality of scan control lines SCL. The scan driver 35 may receive a scan control signal SCS from the lighting device 34 through the plurality of scan control lines SCL.

Figure 6:
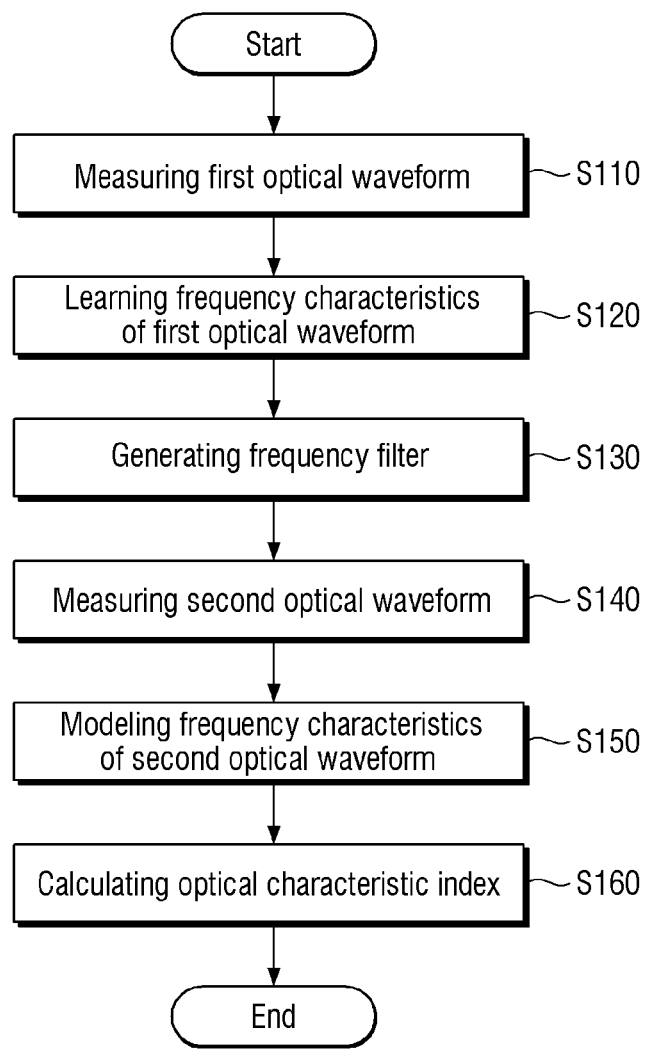
FIG. 6 is a flowchart illustrating an embodiment of a process of calculating an optical characteristic index.

FIG. 6 is a flowchart illustrating an embodiment of a process of calculating an optical characteristic index.

Referring to FIG. 6, the optical sensor 100 may be in direct contact with the first display module 20 or be spaced apart from the first display module 20 to measure the first optical waveform OW1 of the first display module 20 (operation S110). In an embodiment, the optical sensor 100 may measure the luminance of light emitted from the first display module 20, and convert the measured luminance into a voltage, for example.

The learner 200 may receive the first optical waveform OW1 of the reference object from the optical sensor 100 to learn frequency characteristics of the first optical waveform OW1 (operation S120). In an embodiment, the learner 200 may receive the first optical waveform OW1 of the first display module 20 or the second optical waveform OW2 of the second display module 30 from the optical sensor 100 to learn frequency characteristics of the first optical waveform OW1 or the second optical waveform OW2, for example.

The filter generator 300 may analyze the frequency characteristics of the first optical waveform OW1 to generate a frequency filter (operation S130). In an embodiment, the filter generator 300 may calculate a range of frequency domain values of the first optical waveforms OW1 based on the output value of the first domain converter 210 for each of the plurality of first display modules 20, and may convert the calculated value into a time domain to generate a frequency filter, for example.

The optical sensor 100 may be in direct contact with the second display module 30 or be spaced apart from the second display module 30 to measure the second optical waveform OW2 of the second display module 30 (operation S140). In an embodiment, the optical sensor 100 may measure the luminance of the light emitted from the second display module 30 and convert the measured luminance into a voltage, for example.

The frequency modeling unit 400 may receive the second optical waveform OW2 of the measurement object from the optical sensor 100 and model the frequency characteristic of the second optical waveform OW2 (operation S150). The frequency modeling unit 400 may convert the second optical waveform OW2 of the second display module 30 into a frequency domain, thereby expressing the second optical waveform OW2 as a magnitude value for each frequency.

The optical characteristic detector 500 may calculate an optical characteristic index of the second optical waveform OW2 based on the output value of the frequency modeling unit 400 and the frequency filter generated by the filter generator 300 (operation S160). In an embodiment, the optical characteristic detector 500 may calculate a flicker index of the second optical waveform OW2 by applying the frequency filter and the flicker filter to the output value of the frequency modeling unit 400, for example.

Figure 7:
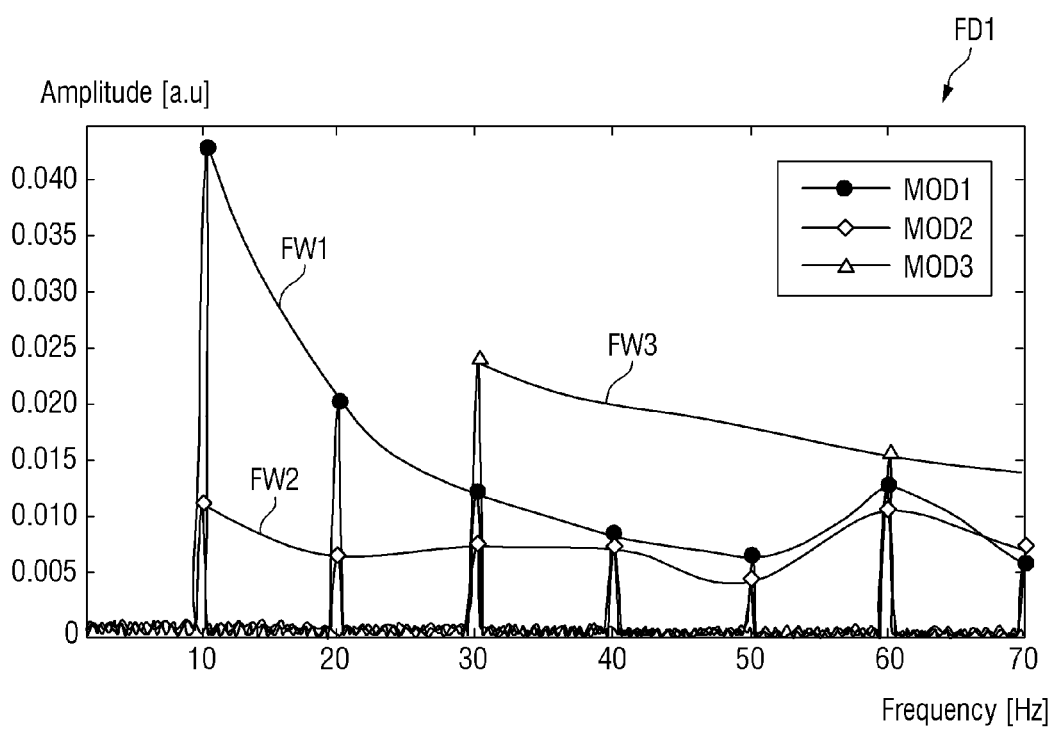
FIG. 7 is a graph illustrating an embodiment of a frequency domain of a first optical waveform.
Figure 8:
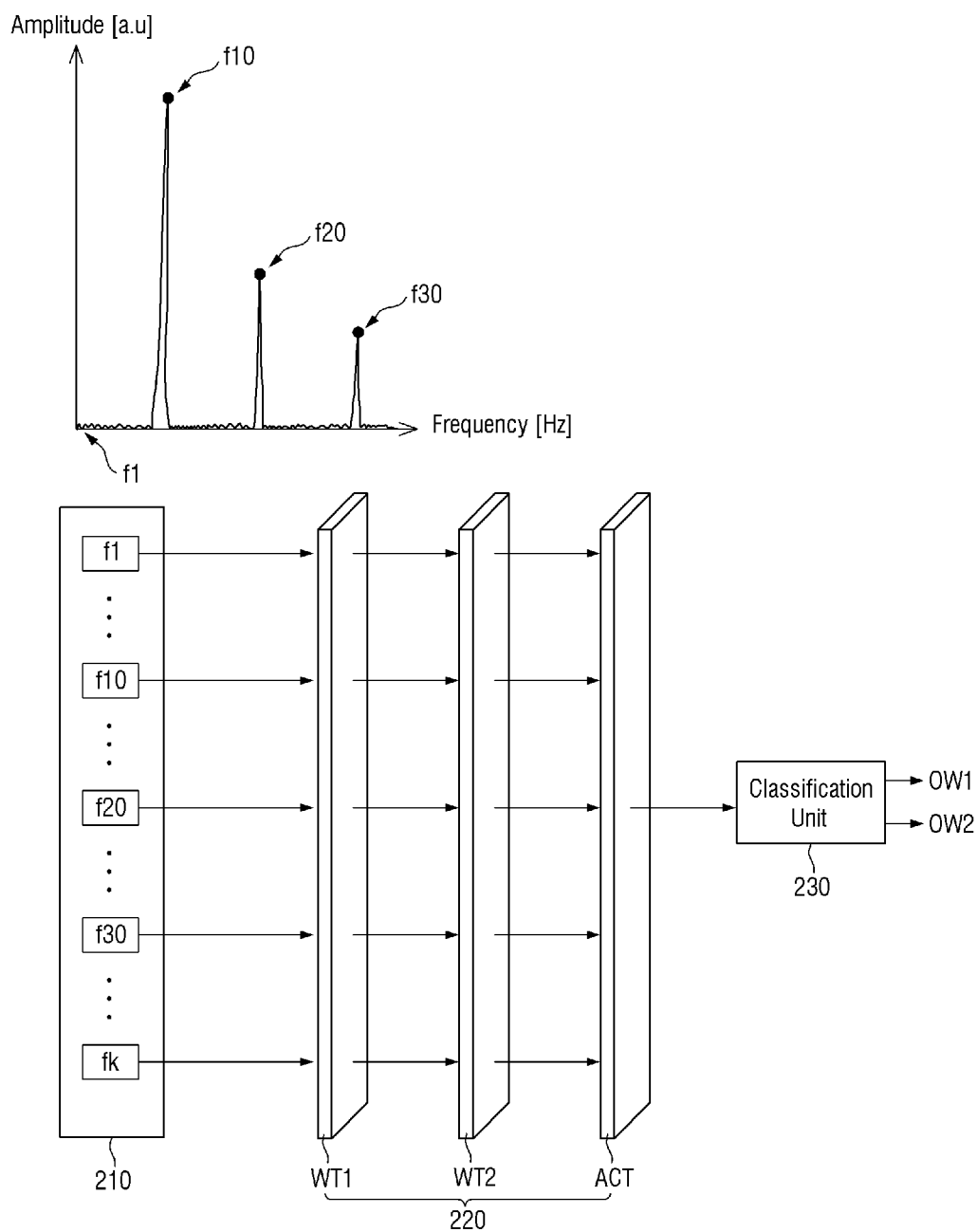
FIG. 8 is a view illustrating an embodiment of a frequency characteristic learning process of a learner.

FIG. 7 is a graph illustrating an embodiment of a frequency domain of a first optical waveform, and FIG. 8 is a view illustrating an embodiment of a frequency characteristic learning process of a learner.

Referring to FIGS. 7 and 8, the first domain converter 210 may receive a first optical waveform OW1 from the optical sensor 100 and convert the first optical waveform OW1 into a frequency domain FD1. The first domain converter 210 may receive the first optical waveforms OW1 of the plurality of reference objects from the optical sensor 100. Here, the plurality of reference objects may be the plurality of first display modules 20 to be used for learning frequency characteristics. In an embodiment, the number of reference objects used for learning frequency characteristics may be hundreds or thousands, but for the convenience of description, first to third reference objects MOD1, MOD2, and MOD3 will be described as an example.

In FIG. 7, the first reference object MOD1 may correspond to one first display module 20 driven according to a driving frequency of 10 hertz (Hz), the second reference object MOD2 may correspond to another first display module 20 driven according to a driving frequency of 10 Hz, and the third reference object MOD3 may correspond to another first display module 20 driven according to a driving frequency of 30 Hz. The frequency domain FD1 of each of the first and second reference objects MOD1 and MOD2 may have a peak value for each multiple of 10 Hz, and the frequency domain FD1 of the third reference object MOD3 may have a peak value for each multiple of 30 Hz. Accordingly, the frequency domain FD1 of each of the first to third reference objects MOD1, MOD2, and MOD3 may have a peak value for each multiple of the driving frequency. The first to third frequency waveforms FW1, FW2, and FW3 of each of the first to third reference objects MOD1, MOD2, and MOD3 may be expressed by connecting peak values arranged for each multiple of the driving frequency.

In FIG. 8, the first domain converter 210 may receive the first optical waveform OW1 of the first reference object MOD1 and convert the received first optical waveform OW1 into the frequency domain FD1. The frequency domain FD1 of the first reference object MOD1 may have a peak value for each multiple of 10 Hz. The output value of the first domain converter 210 may have a magnitude value of the first optical waveform OW1 of the first reference object MOD1 for each frequency.

The weighted value applying unit 220 may apply at least one weighted value filter to the output value of the first domain converter 210. The weighted value applying unit 220 applies a weighted value for each frequency to the frequency domain value of the first optical waveform OW1 to extract the frequency characteristics of the first optical waveform OW1. Therefore, the learner 200 may easily grasp the frequency characteristics of the first optical waveform OW1.

The weighted value applying unit 220 may include first and second weighted value filters WT1 and WT2. The first and second weighted value filters WT1 and WT2 may have different weighted values from each other for each of the plurality of frequencies (fl to fk, k is a natural number of 1 or more). The first weighted value filter WT1 may apply a weighted value for each frequency to the output value of the first domain converter 210, and the second weighted value filter WT2 may apply a weighted value for each frequency to the output value of the first weighted value filter WT1. The weighted value of each of the first and second weighted value filters WT1 and WT2 may be preset according to the purpose and use of the optical measurement device 10. In an embodiment, the weighted value of each of the first and second weighted value filters WT1 and WT2 may be preset according to the user, for example. As example, the weighted value of each of the first and second weighted value filters WT1 and WT2 may be updated according to the repeated learning of frequency characteristics. As example, the weighted value of each of the first and second weighted value filters WT1 and WT2 may be preset by the user and then changed by the user, and may reflect the learning result of frequency characteristics.

The weighted value applying unit 220 may apply an activation function ACT to the output value of the second weighted value filter WT2. In an embodiment, the activation function ACT may output a value of 1 (h(fk)=1) when the output value of the second weighted value filter WT2 for a predetermined frequency (fk, k is a natural number of 1 or more) is close to 1, and may output a value of 0 (h(fk)=0) when the output value of the second weighted value filter WT2 for a predetermined frequency (fk) is close to 0, for example. In another embodiment, the activation function ACT may output a value of 1 (h(fk)=1) when learning the frequency characteristics of the first optical waveform OW1 of the first display module 20, and may output a value of 0 (h(fk)=0) when learning the frequency characteristics of the second optical waveform OW2 of the second display module 30. Therefore, the weighted value applying unit 220 may change the output of the weighted value applying unit 220 to a nonlinear value by the activation function ACT.

The classification unit 230 may classify the kind of the first optical waveform OW1 based on the output value of the weighted value applying unit 220. In an alternative embodiment, the classification unit 230 may classify the kind of the first optical waveform OW1 or the second optical waveform OW2 based on the output value of the weighted value applying unit 220. In an embodiment, when the output value of the weighted value applying unit 220 is 1, the classification unit 230 may determine that the corresponding optical waveform is the first optical waveform OW1 of the first display module 20, for example. When the output value of the weighted value applying unit 220 is 0, the classification unit 230 may determine that the corresponding optical waveform is the second optical waveform OW2 of the second display module 30.

Figure 9:
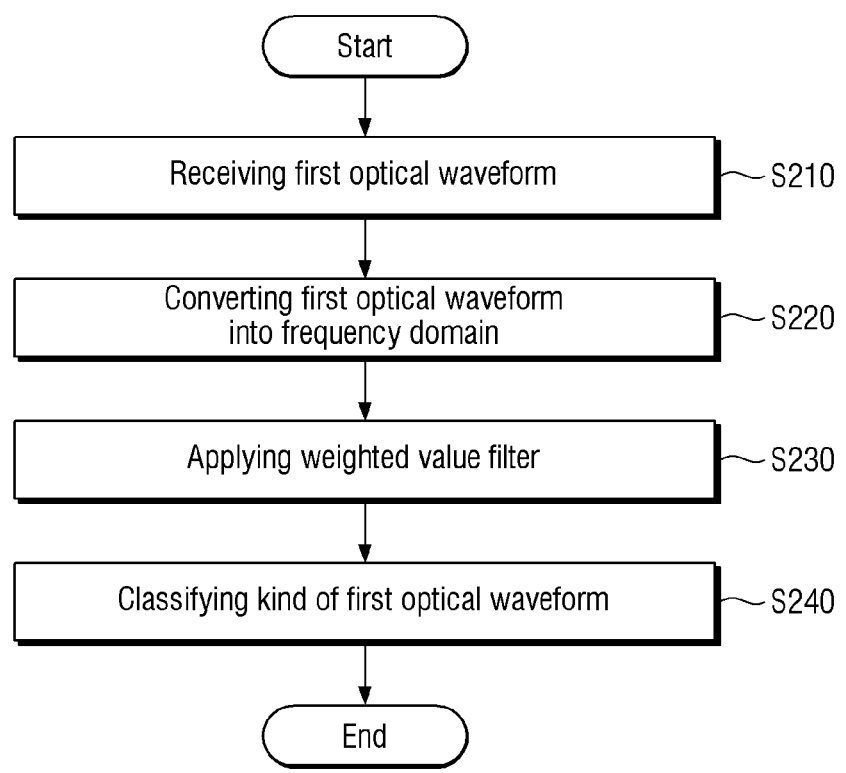
FIG. 9 is a flowchart illustrating an embodiment of a frequency characteristic learning process of a learner.

FIG. 9 is a flowchart illustrating an embodiment of a frequency characteristic learning process of a learner.

Referring to FIG. 9, the first domain converter 210 may receive a first optical waveform OW1 from the optical sensor 100 (operation S210), and may convert the first optical waveform OW1, which is a time domain, into a frequency domain (operation S220). In an embodiment, the first domain converter 210 may receive the first optical waveforms OW1 of the plurality of reference objects from the optical sensor 100, for example. Here, the plurality of reference objects may be the plurality of first display modules 20 to be used for learning frequency characteristics.

The weighted value applying unit 220 may apply at least one weighted value filter to the output value of the first domain converter 210 (operation S230). The weighted value applying unit 220 may extract frequency characteristics of the first optical waveform OW1 by applying a weighted value for each frequency to a frequency domain value of the first optical waveform OW1.

The classification unit 230 may classify the kind of the first optical waveform OW1 based on the output value of the weight value applying unit 220 (operation S240).

Figure 10:
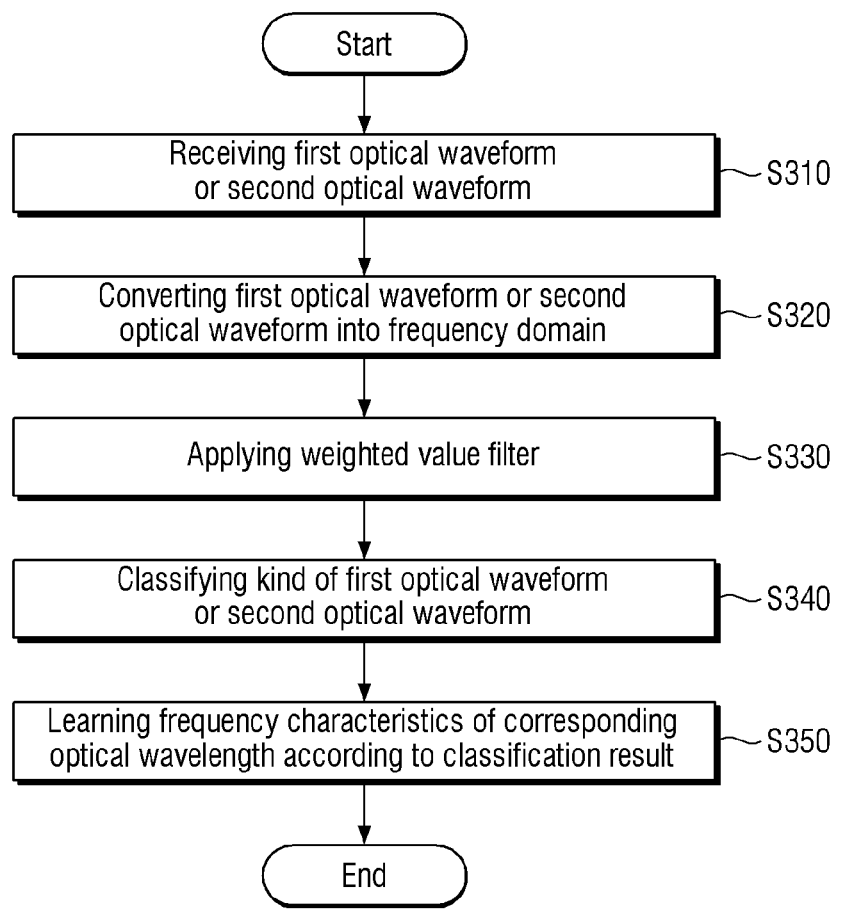
FIG. 10 is a flowchart illustrating another embodiment of a frequency characteristic learning process of a learner.

FIG. 10 is a flowchart illustrating an embodiment of a frequency characteristic learning process of a learner.

Referring to FIG. 10, the first domain converter 210 may receive a first optical waveform OW1 or a second optical waveform OW2 from the optical sensor 100 (operation S310).

The first domain converter 210 may convert the first optical waveform OW1 or the second optical waveform OW2, which is a time domain, into a frequency domain (operation S320). In an embodiment, the first domain converter 210 may receive the first optical waveforms OW1 of the plurality of reference objects from the optical sensor 100, for example. The first domain converter 210 may receive the second optical waveforms OW2 of the plurality of measurement objects from the optical sensor 100. Here, the plurality of reference objects may be the plurality of first display modules 20 to be used for learning frequency characteristics, and the plurality of measurement objects may be the plurality of second display modules 30 to be used for learning optical characteristic indexes.

The weighted value applying unit 220 may apply at least one weighted value filter to the output value of the first domain converter 210 (operation S330). The weighted value applying unit 220 may apply at least one weighted value filter to the frequency domain value of the first optical waveform OW1, and may apply at least one weighted value filter to the frequency domain value of the second optical waveform OW2. The weighted value applying unit 220 may extract frequency characteristics of the first optical waveform OW1 or the second optical waveform OW2 by applying a weighted value for each frequency to a frequency domain value of the first optical waveform OW1 or the second optical waveform OW2.

The classification unit 230 may classify the kind of the first optical waveform OW1 or the second optical waveform OW2 based on the output value of the weight value applying unit 220 (operation S340).

The learner 200 may learn frequency characteristics of the corresponding optical waveform according to the classification result of the classification unit 230 (operation S350). Accordingly, the learner 200 may receive the first optical waveform OW1 of the reference object or the second optical waveform OW2 of the measurement object from the optical sensor 100 to learn the frequency characteristics of the first optical waveform OW1 or the second optical waveform OW2.

Figure 11:
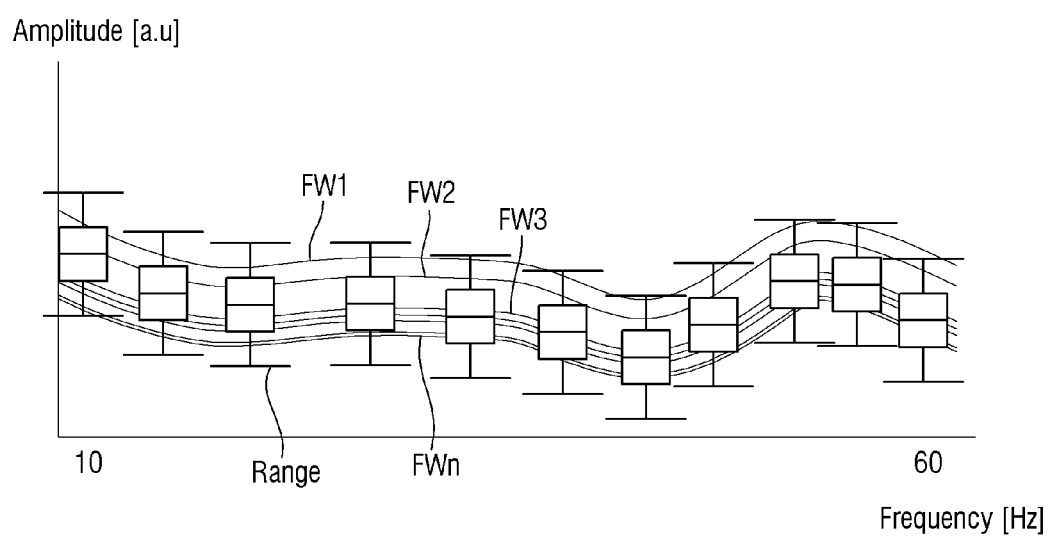
FIG. 11 is a graph illustrating an embodiment of a range of frequency domain values of first optical waveforms.
Figure 12:
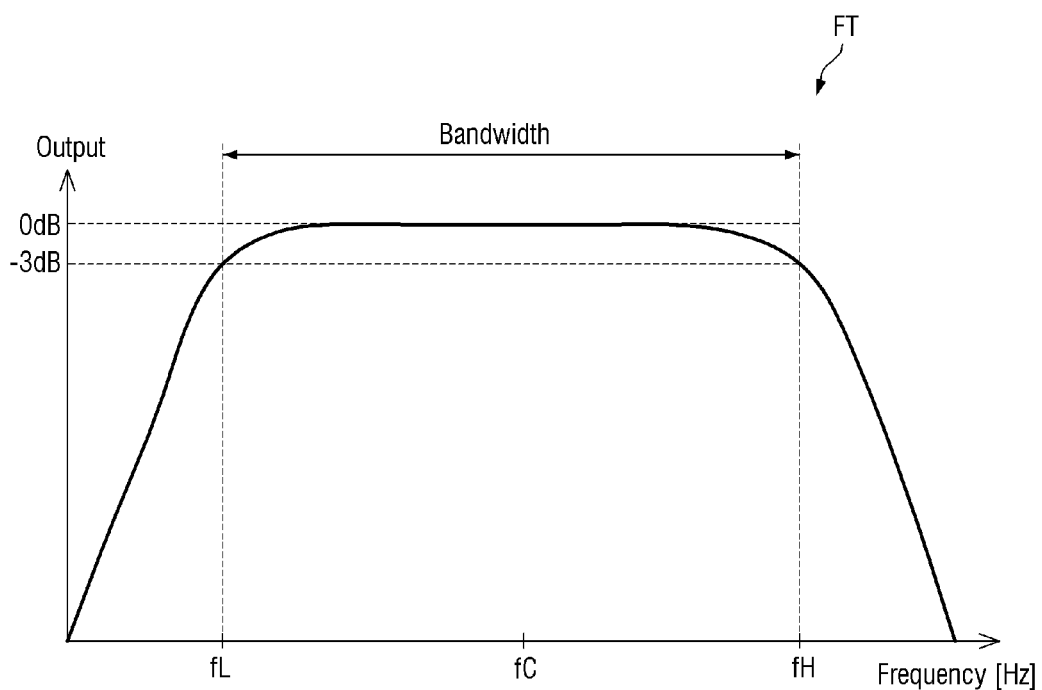
FIG. 12 is a graph illustrating an embodiment of a frequency filter.

FIG. 11 is a graph illustrating an embodiment of a range of frequency domain values of first optical waveforms, and FIG. 12 is a graph illustrating an embodiment of a frequency filter.

Referring to FIGS. 3, 11 and 12, the filter generator 300 may include a frequency domain receiver 310, a range calculator 320, and a second domain converter 330.

The frequency domain receiver 310 may receive an output value of the first domain converter 210 for each of the plurality of reference objects and supply the output value to the range calculator 320. In an embodiment, when the first domain converter 210 converts a first optical waveform OW1 of each of the first to nth reference objects into a frequency domain FD1 (n is a natural number), the output value of the first domain converter 210 for each of the first to nth reference objects may have a plurality of peak values, for example. The first to nth frequency waveforms FW1 to FWn of the first to nth reference objects may be expressed as a curve by connecting the plurality of peak values.

The range calculator 320 may calculate a range of the first to nth frequency waveforms FW1 to FWn of the first to nth reference objects. In an embodiment, the range calculator 320 may calculate a range of magnitudes of the first to nth frequency waveforms FW1 to FWn for each frequency, for example. The range of the magnitudes of the first optical waveforms OW1 for each frequency may correspond to statistical frequency characteristics of frequency domain values of the first optical waveforms OW1.

The second domain converter 330 may generate a frequency filter FT by converting the output value of the range calculator 320 to a time domain. The output value of the range calculator 320 may be expressed as a frequency domain, and the second domain converter 330 may convert a range of magnitudes for each frequency into the time domain. Accordingly, the second domain converter 330 may generate a frequency filter FT expressed as the time domain. In an embodiment, the second domain converter 330 may convert the domain of the output value of the range calculator 320 using Inverse Fast Fourier Transform ("IFFT"), for example, but the invention is not limited thereto.

In an embodiment, the frequency filter FT of the filter generator 300 may be a band pass filter that passes a predetermined frequency band of the first optical waveform OW1, for example. In this case, the frequency filter FT may block a frequency component below the first cutoff frequency fL and a frequency component above the second cutoff frequency fH. Therefore, the frequency filter FT may have a bandwidth between the first cutoff frequency fL and the second cutoff frequency fH. The frequency filter FT may have a center frequency fC between the first cutoff frequency fL and the second cutoff frequency fH.

Figure 13:
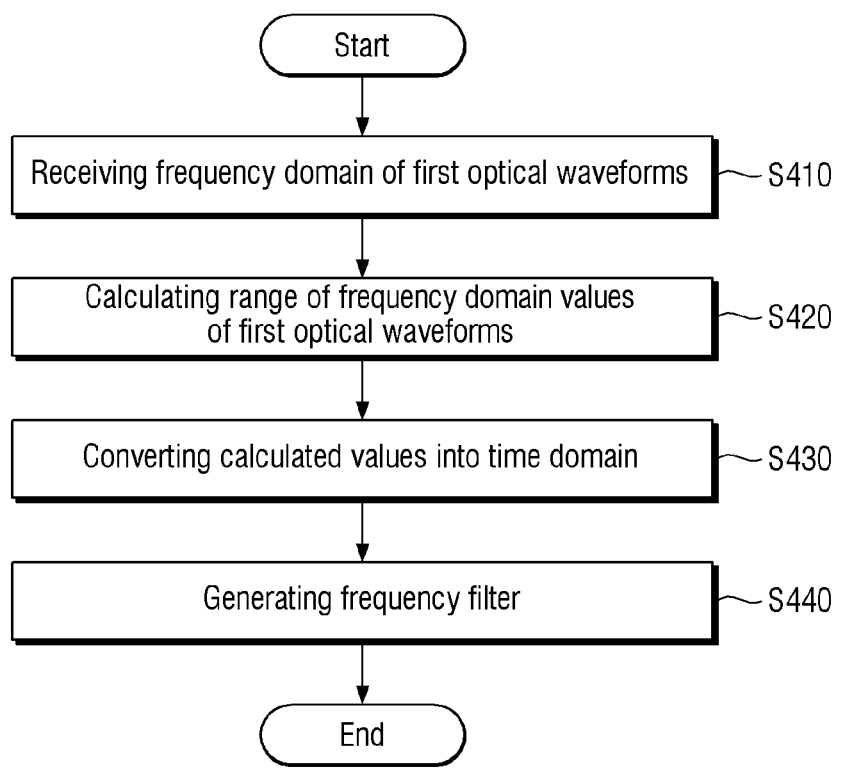
FIG. 13 is a flowchart illustrating an embodiment of a process of generating a frequency filter of a filter generator.

FIG. 13 is a flowchart illustrating an embodiment of a process of generating a frequency filter of a filter generator.

Referring to FIGS. 3 and 13, the filter generator 300 may include a frequency domain receiver 310, a range calculator 320, and a second domain converter 330.

The frequency domain receiver 310 may receive frequency domain values of each of the plurality of first optical waveforms OW1 (operation S410). The frequency domain receiver 310 may receive an output value of the first domain converter 210 for each of the plurality of reference objects and supply the output value to the range calculator 320.

The range calculator 320 may calculate a range of frequency domain values of the first optical waveforms OW1 of the plurality of reference objects (operation S420). The range calculator 320 may calculate a range of frequency domain values of the first optical waveforms OW1 of each of the plurality of first display modules 20.

The second domain converter 330 may convert the output value of the range calculator 320 into a time domain (operation S430). In an embodiment, the second domain converter 330 may converter the domain of the output value of the range calculator 320 using IFFT, for example.

The second domain converter 330 may generate a frequency filter FT expressed as the time domain (operation S440). The frequency filter may be a band pass filter that passes a predetermined frequency band of the first optical waveform OW1, but is not limited thereto.

Figure 14:
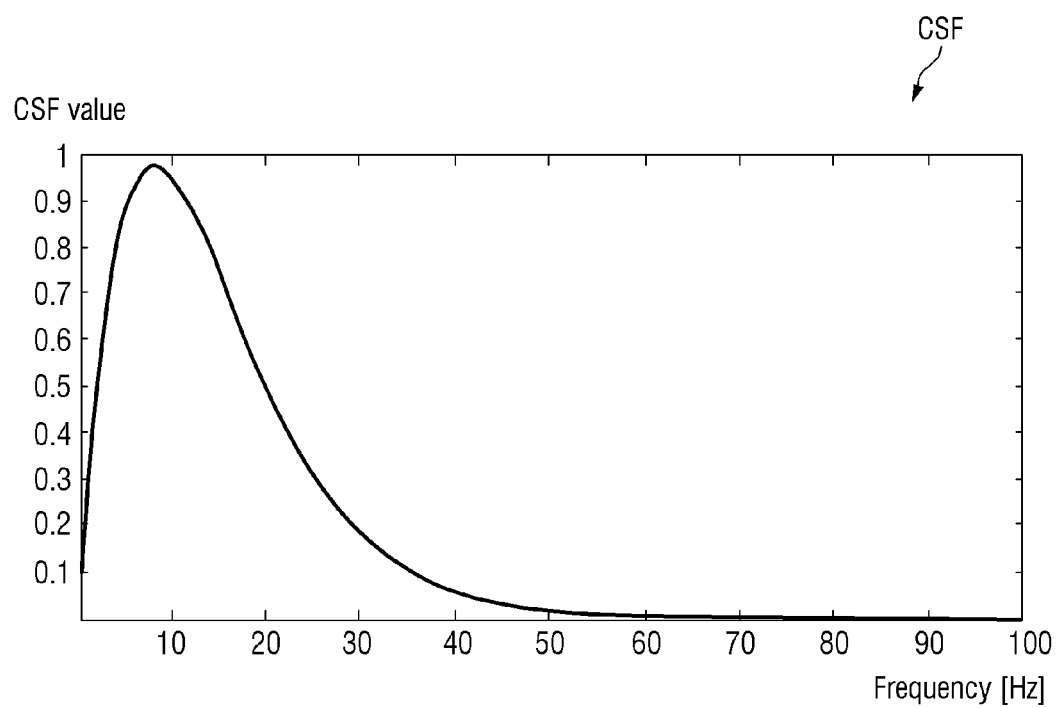
FIG. 14 is a graph illustrating an embodiment of a flicker filter.
Figure 15:
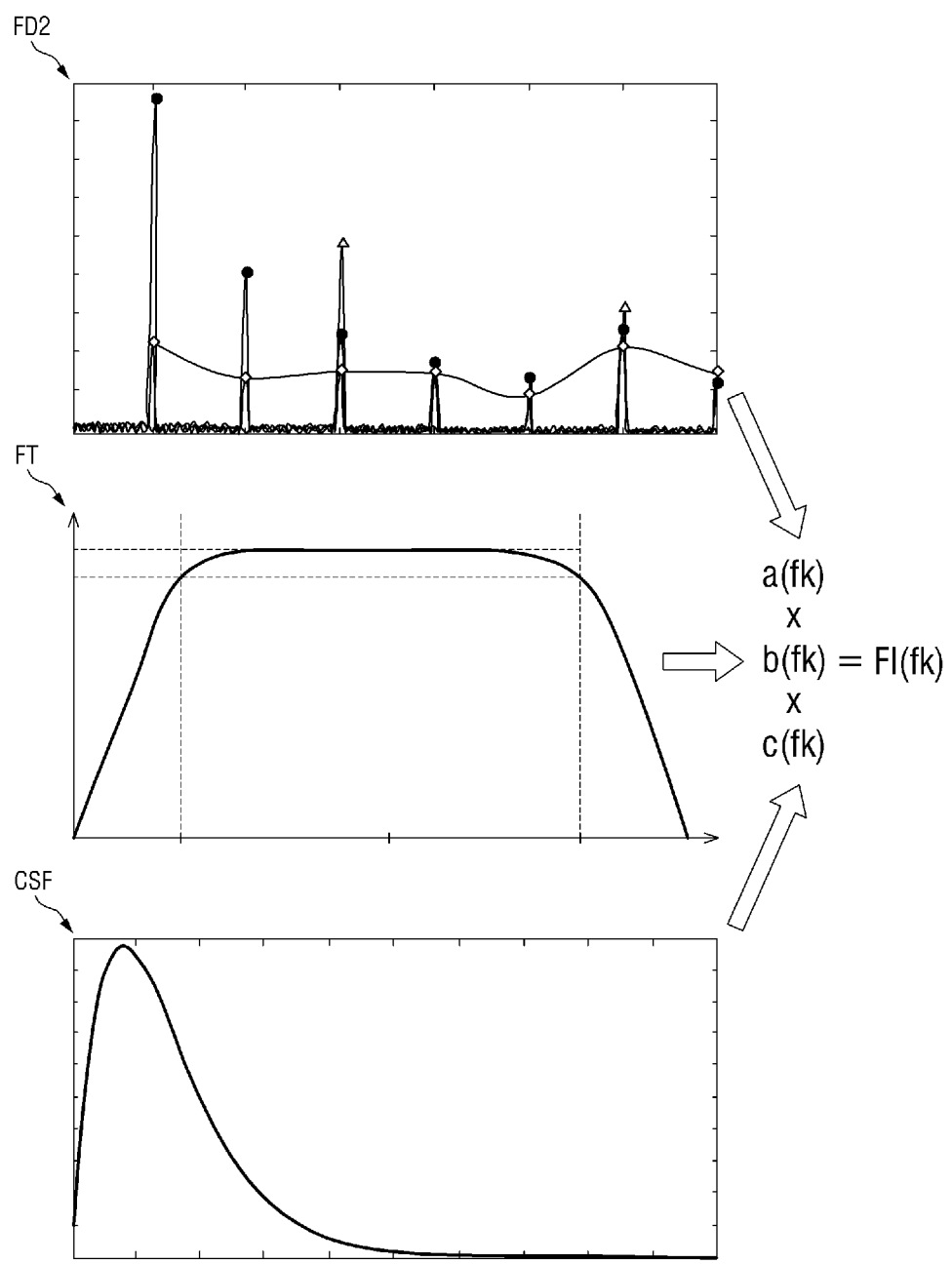
FIG. 15 is a view illustrating an embodiment of a process of calculating a flicker index of an optical characteristic detector.

FIG. 14 is a graph illustrating an embodiment of a flicker filter, and FIG. 15 is a view illustrating a process of calculating a flicker index of an optical characteristic detector.

Referring to FIGS. 14 and 15, the optical characteristic detector 500 may apply a frequency filter FT and a flicker filter CSF to an output value (a(fk), fk is a frequency of 1 to k [hz]) of the frequency modeling unit 400 to calculate the flicker index FI(fk) of the second optical waveform OW2 (FI(fk)=a(fk)*b(fk)*c(fk)). Here, a(fk) may correspond to a frequency domain value of the second optical waveform OW2, b(fk) may correspond to a frequency filter FT value at a predetermined frequency fk, and c(fk) may correspond to a flicker filter value (CSF value) at a predetermined frequency fk. Here, the flicker index FI(fk) of the second optical waveform OW2 refers to degree to which a flicker phenomenon occurring in the second optical waveform OW2 originates from the display driver 23. In FIG. 14, the flicker filter CSF may be a contrast sensitivity function, but is not limited thereto. As the flicker index FI(fk) of the second optical waveform OW2 increases, the flicker generation degree of the second optical waveform OW2 by the display driver 23 may increase.

Figure 16:
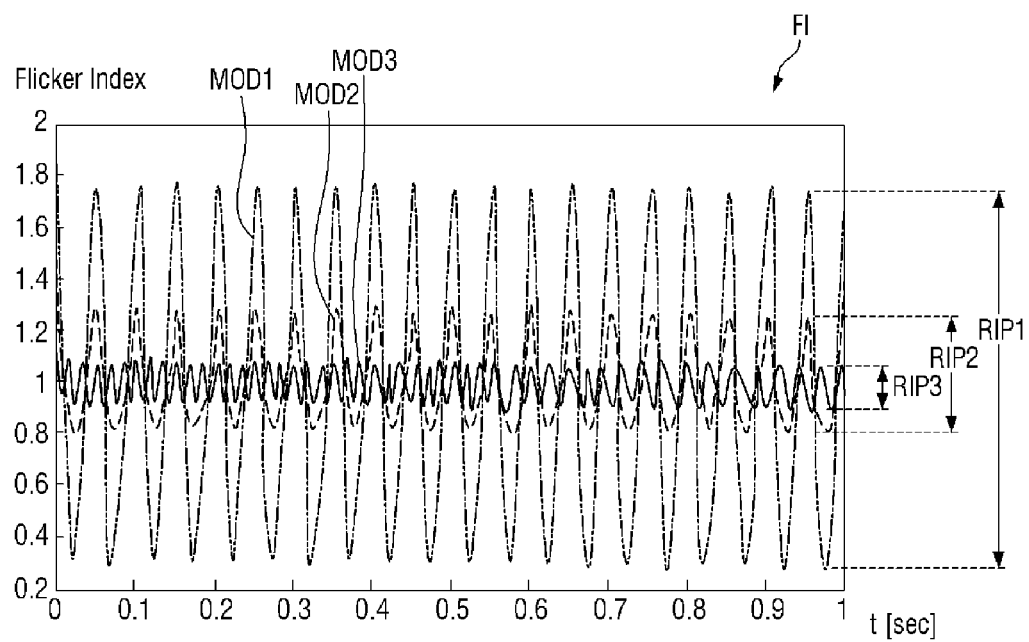
FIG. 16 is a graph illustrating an embodiment of a flicker index.

FIG. 16 is a graph illustrating an embodiment of a flicker index. The driving frequency fd of each of the first to third reference objects MOD1, MOD2, and MOD3 illustrated in FIG. 16 may be different from the driving frequency fd of each of the aforementioned first to third reference objects MOD1, MOD2, and MOD3.

Referring to FIG. 16, the waveform of the flicker index (FI) of each of the first to third reference objects MOD1, MOD2, and MOD3 may have a period T corresponding to the driving frequency fd of the reference object (T=1/fd).

The waveform of the flicker index FI of the first reference object MOD1 may have a first ripple value RIP1, the waveform of the flicker index FI of the second reference object MOD2 may have a second ripple value RIP2, and the waveform of the flicker index FI of the third reference object MOD3 may have a third ripple value RIP3. Here, the ripple value corresponds to a difference between the maximum value and the minimum value of the flicker index (FI). As the ripple value of the flicker index FI increases, the flicker generation degree of the second optical waveform OW2 by the display driver 23 may increase.

In an embodiment, in the first reference object MOD1, a flicker phenomenon of the second optical waveform OW2 by the display driver 23 may occur most frequently, and in the third reference object MOD3, a flicker phenomenon of the second optical waveform OW2 by the display driver 23 may hardly occur, for example.

Therefore, the optical measurement device 10 may measure the frequency characteristics of the first optical waveform OW1 from the second optical waveform OW2 using the learning result of the frequency characteristic, and may omit the test process of the first display module 20 by the test result of the second display module 30. The optical measurement device 10 may omit the test process of the first display module 20 after the learning of the first display module 20 is completed, and may reduce cost and time in the manufacturing process of the display device or the display module.

According to the optical measurement device of embodiments, the frequency characteristics resulting from a display panel and the frequency characteristics resulting from a display driver may be learned by learning the frequency characteristics of a first optical waveform emitted from a display module driven by the display driver.

According to the optical measurement device of embodiments, the optical measurement device may measure a second optical waveform emitted from the display panel driven by a lighting device to detect the optical characteristic index resulting from the display driver from the second optical waveform. Accordingly, the optical measurement device may measure the frequency characteristics of the first optical waveform from the second optical waveform by the learning result of the frequency characteristics of the first optical waveform, and may omit the test process of the display module driven by the display driver by the test result of the display panel driven by the lighting device. The optical measurement device may omit the test process of the first display module 20 after the learning of the first display module is completed, and may reduce cost and time in the manufacturing process of the display device or the display module.

The effects of the invention are not limited by the foregoing, and other various effects are anticipated herein.

Although the preferred embodiments of the invention have been disclosed for illustrative purposes, those skilled in the art will appreciate that various modifications, additions and substitutions are possible, without departing from the scope and spirit of the invention.

What is claimed is:

1. An optical measurement device, comprising:
an optical sensor which measures an optical waveform of a light emitted from a reference object or a measurement object;
a learner which receives a first optical waveform of the reference object from the optical sensor and learns frequency characteristics of the first optical waveform;
a filter generator which analyzes the frequency characteristics of the first optical waveform and generates a frequency filter;
a frequency modeling unit which receives a second optical waveform of the measurement object from the optical sensor and models frequency characteristics of the second optical waveform; and
an optical characteristic detector which calculates an optical characteristic index of the second optical waveform based on an output value of the frequency modeling unit and the frequency filter.

2. The optical measurement device of claim 1,
wherein the reference object is a display module including a first display panel and a display driver which supplies a data voltage to the first display panel according to a predetermined driving frequency.

3. An optical measurement device, comprising:
an optical sensor which measures an optical waveform of a reference object or a measurement object;
a learner which receives a first optical waveform of the reference object from the optical sensor and learns frequency characteristics of the first optical waveform;
a filter generator which analyzes the frequency characteristics of the first optical waveform and generates a frequency filter;
a frequency modeling unit which receives a second optical waveform of the measurement object from the optical sensor and models frequency characteristics of the second optical waveform; and
an optical characteristic detector which calculates an optical characteristic index of the second optical waveform based on an output value of the frequency modeling unit and the frequency filter,
wherein the learner includes:
a domain converter which receives the first optical waveform and converts the first optical waveform into a frequency domain;
a weighted value applying unit which applies at least one weighted value filter to an output value of the domain converter; and
a classification unit which classifies a kind of the first optical waveform based on an output value of the weighted value applying unit.

4. The optical measurement device of claim 3
wherein the domain converter converts a domain of the first optical waveform using Fast Fourier Transform.

5. The optical measurement device of claim 3,
wherein the at least one weighted value filter includes a plurality of weighted values corresponding to frequency components of the first optical waveform.

6. The optical measurement device of claim 3,
wherein the weighted value applying unit applies an activation function to an output value of the at least one weighted value filter.

7. The optical measurement device of claim 3,
wherein the learner receives the second optical waveform of the measurement object and learns frequency characteristics of the second optical waveform.

8. The optical measurement device of claim 7,
wherein the learner converts the first optical waveform or the second optical waveform into a frequency domain and applies the at least one weighted value filter to learn frequency characteristics of the first optical waveform or the second optical waveform.

9. The optical measurement device of claim 3,
wherein the reference object is provided in plural, and
wherein the filter generator calculates a range of frequency domain values of the first optical waveforms of a plurality of reference objects based on the output value of the domain converter for each of the plurality of reference objects, converts the calculated value into a time domain, and generates a frequency filter.

10. The optical measurement device of claim 3,
wherein the filter generator generates a band pass filter which passes a predetermined frequency band of the first optical waveform.

11. The optical measurement device of claim 1,
wherein the measurement object receives a direct current voltage from a lighting device and emits light.

12. The optical measurement device of claim 1,
wherein the frequency modeling unit converts the second optical waveform into a frequency domain to model frequency characteristics of the second optical waveform.

13. The optical measurement device of claim 1,
wherein the optical characteristic detector applies the frequency filter and a flicker filter to an output value of the frequency modeling unit and calculates a flicker index of the second optical waveform.

14. The optical measurement device of claim 13,
wherein the flicker filter is a contrast sensitivity function.

15. An optical measurement device, comprising:
a learner which receives a first optical waveform of a first display module including a first display panel and a display driver which supplies a data voltage to the first display panel according to a predetermined driving frequency, and learns frequency characteristics of the first optical waveform;
a filtering unit which analyzes frequency characteristics of the first optical waveform and generates a frequency filter;
a frequency modeling unit which receives a second optical waveform of a second display panel which receives a direct current voltage from a lighting device and models frequency characteristic of the second optical waveform; and
an optical characteristic detector which calculates an optical characteristic index of the second optical waveform based on an output value of the frequency modeling unit and the frequency filter.

16. The optical measurement device of claim 15,
wherein the learner includes:
a domain converter which receives the first optical waveform and converts the first optical waveform into a frequency domain;
a weighted value applying unit which applies at least one weighted value filter to an output value of the domain converter; and
a classification unit which classifies a kind of the first optical waveform based on an output value of the weighted value applying unit.

17. The optical measurement device of claim 15,
wherein the learner receives the second optical waveform of the second display panel and learns frequency characteristics of the second optical waveform.

18. The optical measurement device of claim 17,
wherein the learner converts the first optical waveform or the second optical waveform into a frequency domain and applies at least one weighted value filter to learn the frequency characteristics of the first optical waveform or the second optical waveform.

19. The optical measurement device of claim 15,
wherein the optical characteristic detector applies the frequency filter and a flicker filter to the output value of the frequency modeling unit and calculates a flicker index of the second optical waveform.

20. The optical measurement device of claim 19,
wherein the optical characteristic detector analyzes flicker characteristics of the first display module including the first display panel and the display driver based on the flicker index of the second optical waveform.

\* \* \* \* \*